Nov. 29, 1966    K. WARGA    3,288,093
DEVICE FOR FORMING AND TYING BELT LOOPS
Filed Oct. 14, 1964    6 Sheets-Sheet 1

INVENTOR.
KENNETH WARGA

BY Kimmel & Crowell
ATTORNEYS.

Nov. 29, 1966  K. WARGA  3,288,093
DEVICE FOR FORMING AND TYING BELT LOOPS
Filed Oct. 14, 1964  6 Sheets-Sheet 2

INVENTOR
KENNETH WARGA
BY Kimmel & Crowell
ATTORNEYS

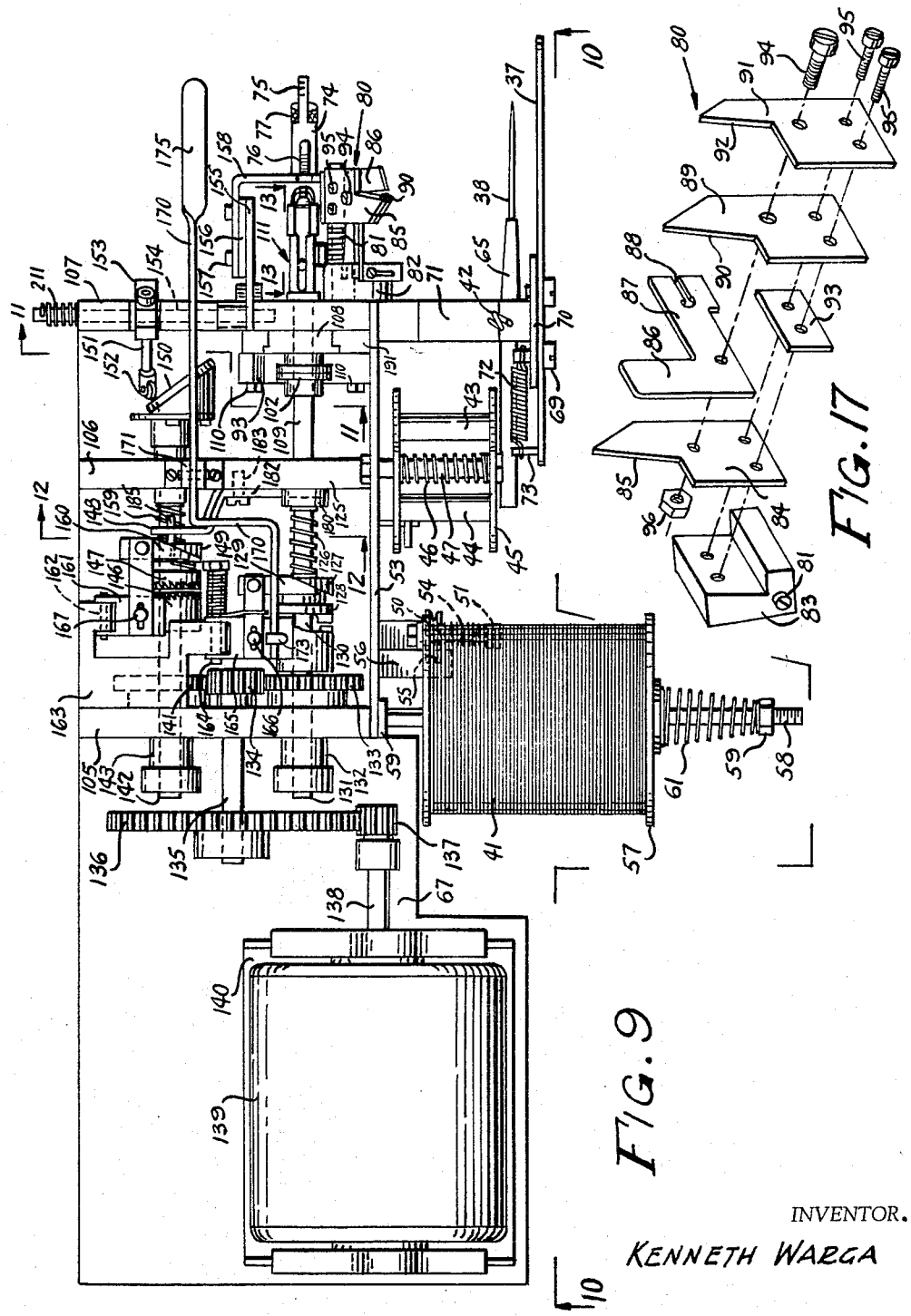

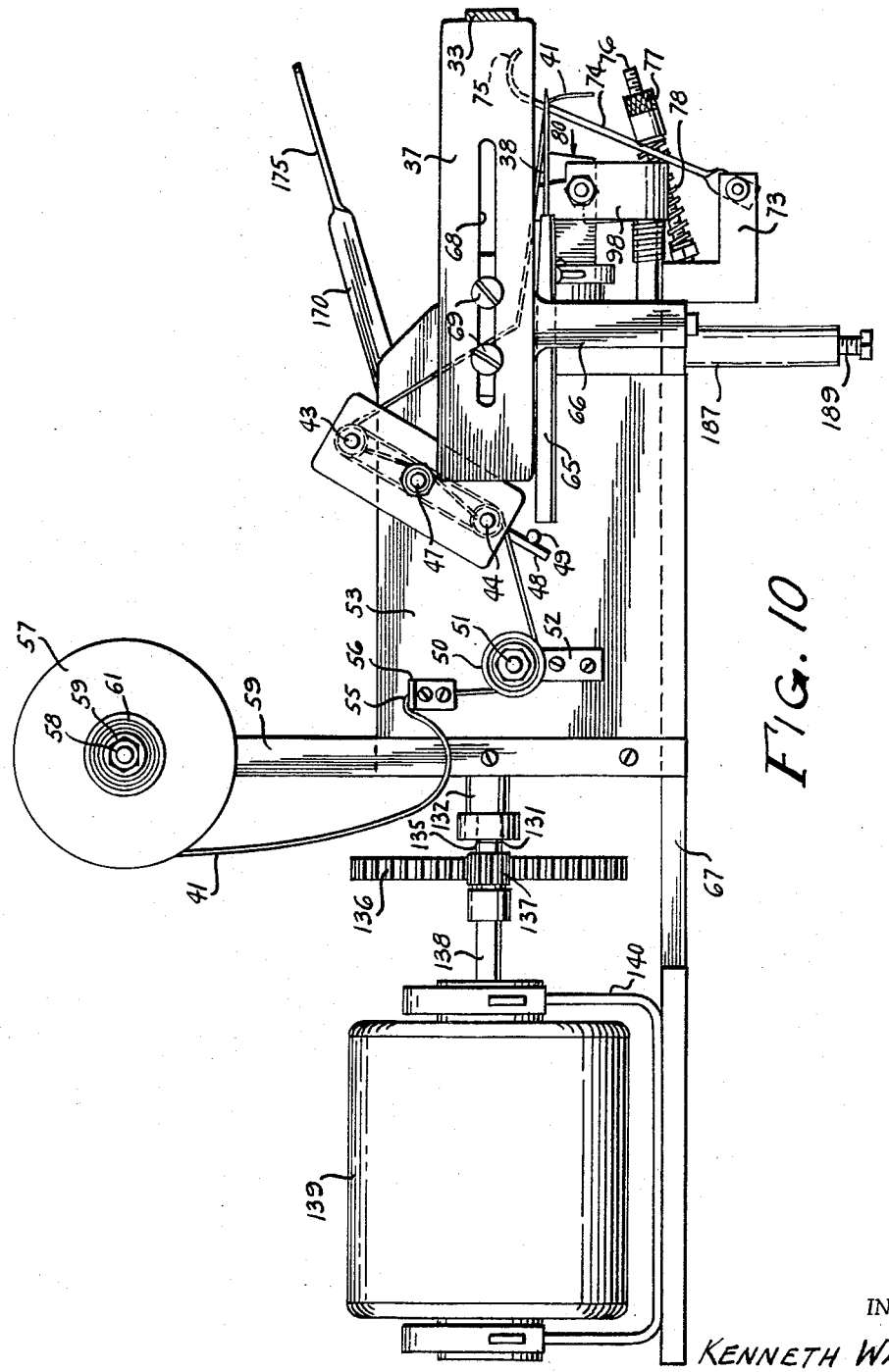

Nov. 29, 1966 K. WARGA 3,288,093
DEVICE FOR FORMING AND TYING BELT LOOPS
Filed Oct. 14, 1964 6 Sheets-Sheet 5
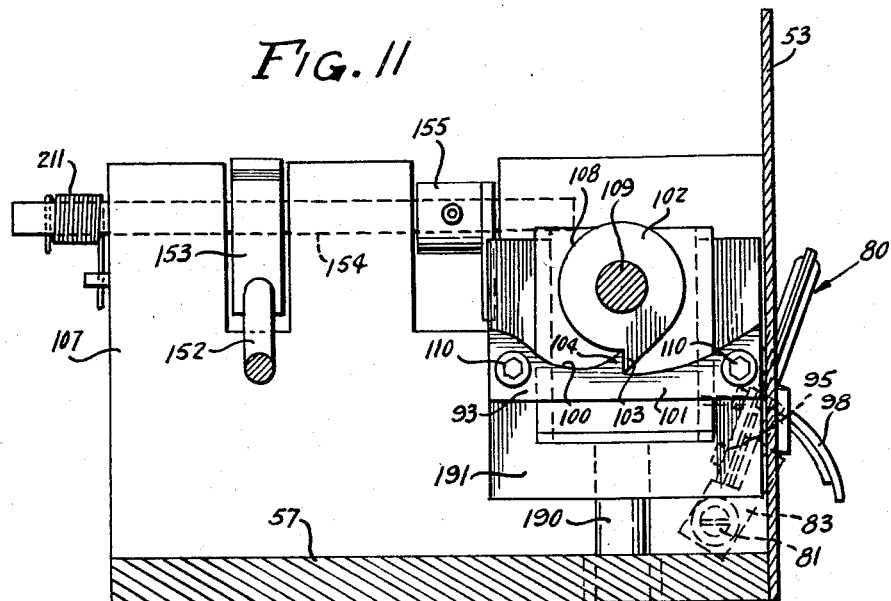
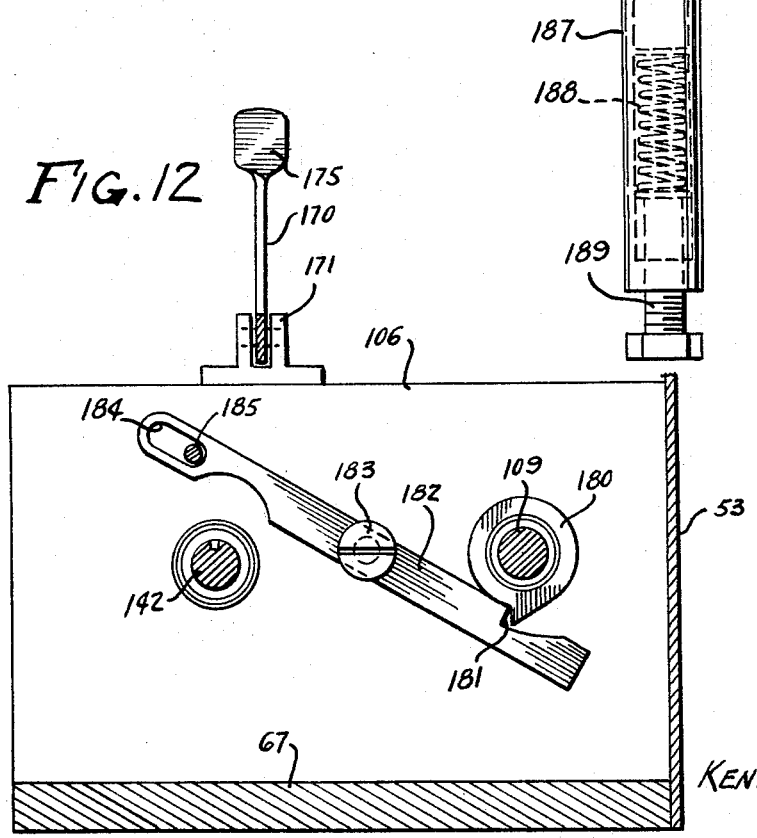
INVENTOR.
KENNETH WARGA
BY Kimmel & Crowell
ATTORNEYS.

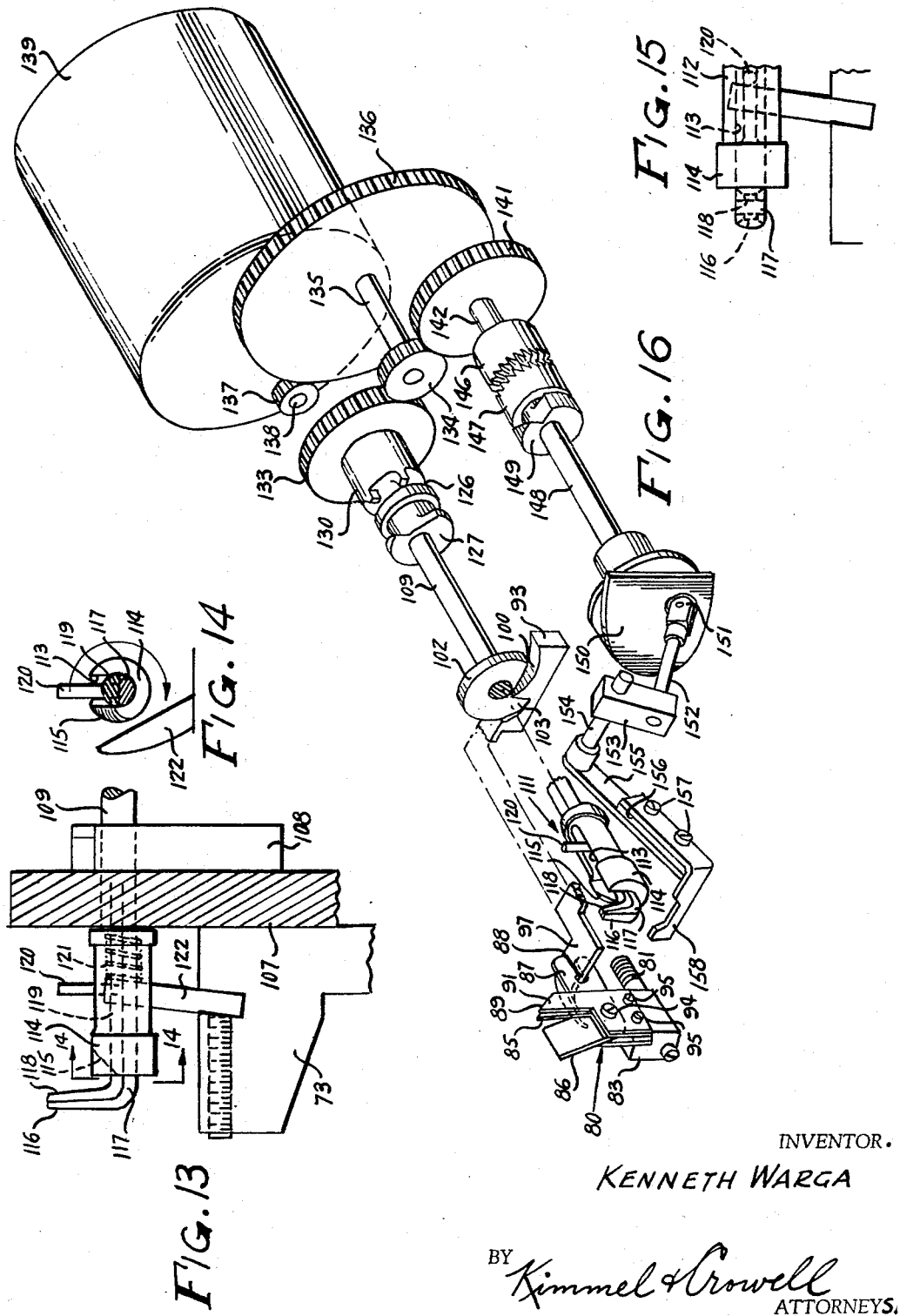

United States Patent Office 3,288,093
Patented Nov. 29, 1966

3,288,093
DEVICE FOR FORMING AND TYING BELT LOOPS
Kenneth Warga, 1025 Clay Ave., Scranton, Pa.
Filed Oct. 14, 1964, Ser. No. 403,775
12 Claims. (Cl. 112—104)

This invention relates to a device for forming and tying belt loops, and more particularly those belt loops which are comprised of a single strand of thread and customarily employed in conjunction with women's dresses or the like.

A primary object of this invention is the provision of a device which will, in a single series of operations, thread the material forming the belt loop through a double thickness of the garment, tie a knot in the belt loop on the reverse side of the garment, and lift the loop simultaneously from the tying mechanism upon completion of the knot to permit removal of the garment with the completed belt loop formed therein.

As conducive to a clearer understanding of the instant invention, it may be pointed out that heretofore belt loops have been formed by inserting the thread through a double thickness of material, and then severing the thread from the spool and tying the ends of the loop manually. Various mechanical methods have been provided for the insertion and positioning of the material, but the manual tying of the knot therein has been the most time consuming element of the process, and a step frequently impaired by human error.

A primary object of this invention is, therefore, the provision of a device which will eliminate the manual tying of such knots, tying the knots mechanically, and simultaneously severing the thread so that the garment with the completed belt loop is then ready for the passage to the next step in the manufacture thereof.

An additional object of the invention is the provision of a device of this character which is sturdy and durable in construction, reliable and efficient in operation, and relatively simple and inexpensive to operate.

A further object is the provision of a device of this character which will, by tying the knots as above described, materially facilitate the manufacture of such garments as women's dresses, and eliminate a hitherto time consuming step in the process of manufacture thereof.

Still other objects will in part be obvious and in part be pointed out hereinafter as the description of the invention proceeds and shown in the accompanying drawings wherein there is shown a preferred embodiment of this inventive concept.

In the drawings:

FIGURE 1 is a perspective view of the completely assembled belt loop forming and knot tying apparatus, mounted on a base, and including an adjustable support for a garment in which the belt loop is to be positioned;

FIGURES 2, 3, 4, 5, and 6 are sequential steps in the positioning of the thread forming the belt loop in position in the garment prior to tying;

FIGURE 9 is an enlarged top plan view of the belt loop forming and tying apparatus with the casing therefor removed;

FIGURE 10 is a side elevational view of the apparatus as viewed from the bottom in FIGURE 9;

FIGURE 11 is an enlarged sectional view taken substantially along the line 11—11 of FIGURE 9, as viewed in the direction indicated by the rarows;

FIGURE 12 is an enlarged sectional view taken substantially along the line 12—12 of FIGURE 9, as viewed in the direction indicated by the arrows;

FIGURE 13 is an enlarged sectional view taken substantially along the line 13—13 of FIGURE 9 as viewed in the direction indicated by the arrows;

FIGURE 15 is a fragmentary side elevational view of the parts shown in FIGURE 14;

FIGURE 16 is an exploded perspective view showing the relationship of certain operating parts of the device, and FIGURE 17 is an exploded perspective view showing the assembly of the thread holder and scissors mechanism.

Similar reference characters refer to similar parts throughout the several views of the drawings.

Figure 1:
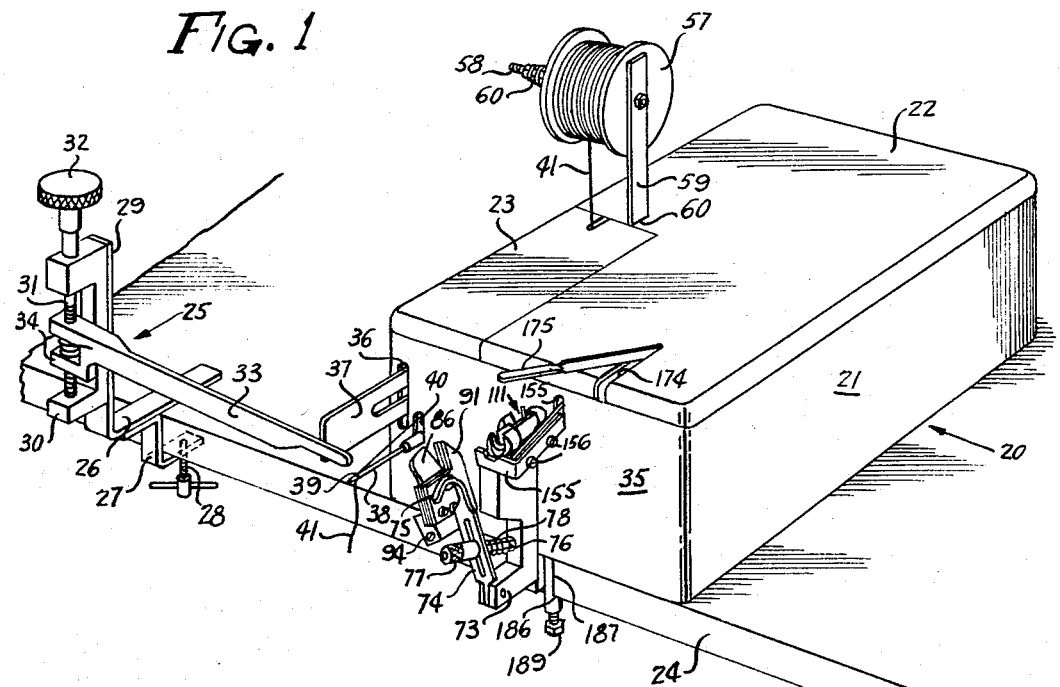

Having reference now to the drawings in detail, the device of the instant invention is generally indicated at 20 and comprises a casing 21 having a removable cover 22 which, adjacent one corner thereof, has a removable segment 23. The casing is adapted to be mounted on a support or a table 24, adjacent a garment support assembly 25. The support assembly is conventional in construction and includes a bracket 26 having a lower clamping arm 27 through which extends a screw 28 which is adapted to clamp the assembly to the table. The bracket also includes an upright arm 29 which has a forwardly projecting yoke 30 extending therefrom, between the arms of which extends an adjusting screw 31 provided with a knurled head 32. A garment supporting arm 33 is pivotally mounted on the screw 31 by means of a bifurcated end 34, the arrangement being such that the arm 33 may be swung outwardly or inwardly, or raised or lowered in accordance with the work to be performed.

The front wall 35 of casing 21 is provided with a slotted opening 36, through which extends a needle guard arm 37 which is juxtaposed closely to the garment supporting arm 33 in normal operation. A needle 38 having an eye 39 adjacent its end projects from an opening 40 adjacent the opening 36, and is provided with a thread 41 of belt loop forming material.

As best shown in FIGURE 10, the thread 41 extends rearwardly into the casing, and thence through an eye 42 from which it is wound about spindles 43 and 44 comprising portions of a thread feeding rocker including side plates 45, which is pivotally mounted on a central pivot pin 46. A coil spring 47 wound about the pivot pin normally biases the feeding mechanism to the position shown in FIGURE 10, an extension 48 engaging a pin 49 and holding the mechanism in the position shown. Thread 41 extends from the lower spindle 44 to a pulley 50 which is mounted on an axle 51 carried by a bracket 52 which is in turn mounted on a partition 53 interiorly of the casing. A spring 54 normally urges the pulley inwardly towards alignment with an eye 55 in an L-shaped bracket 56, through which the thread extends. The thread 41 thence extends upwardly to a spool 57 mounted on an axle 58 which is carried by an upright 59, which extends through an opening 60 in the top 22 of the casing 21, and is secured thereon.

A compression spring 61 on the outer end of axle 58 secured in position by a nut 59 provides frictional resistance to the rotation of the reel, and prevents slack in the thread rolled thereon.

The needle 38 is removably positioned in a fixed holder 65, which is mounted on an upright 66 carried on a base or bottom plate 67 upon which the mechanism is mounted.

The needle guard 37, as best shown in FIGURES 9 and 10, comprises an elongated plate having a longitudinal slot 68 therein through which extend screws 69, which are engaged in a fixed plate 70, which in turn is carried by a transverse arm 71, upon which the eye 42 is mounted. A spring 72 extends between a pin 73 carried by the inner end of plate 37, and one of screws 69 normally urging the guard to extended position, beyond the point of needle 38. However, the guard 37 is yieldable, when it is desired to expose the point of the needle to permit the garment to be impaled thereon, in a manner to be more fully described hereinafter.

The front wall 35 of casing 21 also carries a bracket 73, from a lower leg of which extends a slotted arm 74 terminating a hook 75. A bolt 76 extends through the slot in the arm and is provided with an adjusting head 77 which acts against the spring 78 to vary the relative position of the loop engaging hook for a purpose to be described more fully hereinafter.

A thread holder and scissors assembly generally indicated at 80 is mounted on a pivot or axle 81, which is rotatable in a boss 82 located interiorly of the casing; the thread holder and scissors comprising as best shown in FIGURE 17 a generally L-shaped block 83 through which the axle 81 extends, a first fixed blade 84 having a fixed cutting edge 85, a movable L-shaped blade 86 having an extending leg 87 provided with a slot 88, a second fixed blade 89 having a cutting edge 90 and a third fixed blade 91 having an edge 92. A spacer plate 93 is provided beneath the pivoted blade, which is mounted on a screw 94 which extends through aligned openings in each of the fixed blades and the pivoted blade 86. Additional screws 95 extend through aligned openings in the three fixed blades, and the spacer block into openings in the L-shaped member 83 for holding the parts in related assembly, while a nut 96 engages the end of screw 94 which serves as the pivot for the pivoted blade.

A guide 97 extends into the slot 88, and terminates in an arcuate outwardly extending portion 98, to guide the thread holder and scissors assembly in its pivotal movement about the pivot 81.

A cam block 99 movably mounted in the casing has a pair of cam surfaces 100 and 101 thereon which are selectively engaged by a cam 102 having a relatively sharp point 103. The arrangement is such that as the cam is rotated, in a manner to be more fully described hereinafter, and moves in the first dwell 100, the movable jaw is moved to an extent sufficient to clamp the thread between its edge and those of the stationary blades 85 and 89, but after the cam point passes the high dwell 104 of the first cam surface, an abrupt snap action is effected in a manner to be more fully described hereinafter, which causes the blade 86 to move and sever the thread, this operation taking place at a specific time during the operation of the device as will also be described hereinafter.

Base plate 67 has three vertically extending supporting plates positioned thereon, 105, 106, and 107. Plate 107 has a boss 108 thereon, through which extends an operating shaft 109, the latter carrying the cam 102. The shaft 109 extends outwardly through the plate 107 and carrys a knot tying head or assembly generally indicated at 111. The knot tying assembly includes a cylindrical portion 112 having a longitudinal slot 113 therein and terminating in a slotted head 114 having a cam surface at its outer extremity indicated at 115. A fixed upright finger 116 extends upwardly through the top of the slot and thereabove, and is attached to a horizontal shank 117. Adjacent finger 116 is a movable upright finger 118 which is mounted on a horizontal shank 119. The shank 119 is linearly movable and has mounted thereon a cam follower pin 120 which extends upwardly out of the slot 113.

The fingers are normally biased into abutting relation, by means of an internally positioned spring 121. A cam follower 120 is adapted upon rotation of shaft 109 in clockwise direction to engage an inclined cam 122, so that during the rotation of the shaft in the head 111 the fingers 116 and 118 are gradually separated, and at substantially the conclusion of the period of rotation the cam follower finger 120 is disengaged from the cam 122 and the fingers are permitted to re-engage with the snap action.

At its opposite end, the shaft 109 extends through a bushing 125 in supporting partition 106, and terminates in a clutch plate 126, adjacent which is a cam 127, the clutch plate and cam being slidable on the shaft 109 and normally bias away from an opposite clutch plate 130 by a means of the spring 128. A lug 129 serves when moved in a manner to be described to move clutch plate 126 into engagement with opposite clutch plate 130. Clutch plate 130 is carried by a stub shaft 131, which is mounted in a bushing 132 carried by support plate 105, and which carries a gear 133. The gear 133 is in turn driven by a gear 134 carried by an axle 135 journaled in plate 105, upon the opposite end of which is a large reduction gear 136 which is in turn driven by a pinion gear 137 carried by the drive shaft 138 of an electric motor 139. The motor 139 is mounted on a support 140 which in turn is mounted on base 67 within casing 21.

Gear 134 also drives a gear 141 which is mounted on a shaft 142 journaled in a bushing 143 carried by plate 105, with shaft 142 carrying a clutch plate 146, which is opposed by a second clutch plate 147 carried by a shaft 148 which also carries a cam 149. The shaft 148 extends through partition 106 parallel to shaft 109 and has as its outer end, a lifting arm cam 150. Cam 150 has a sharply inclined face which is engaged by a cam follower wheel 151 carried on an arm 152 which is secured in a block 153, the block carrying a pivot shaft 154 therein. The shaft 154 in turn carries an arm 155 to which is attached an adjusting plate 156, to which in turn is secured by screws 157, a loop lifting arm 158 which is positioned directly beneath the knot tying head 111.

Cam face 149 is normally biased away from cam face 146 by means of a spring 159 which surrounds shaft 148, a tapered lug 160 engages cam 149, to engage clutch plates 146 and 147.

The lug 160 is mounted on an arm 161 which is pivoted as at 162 to a plate 163, to the opposite side of which is pivoted as by means of a pivot 164 a similar arm 165. The arm 165 in turn carries the lug 129. Suitable adjusting screws 166 and 167, respectively, permit adjustment of the lug carrying arms relative to the associated cams, the arms being slotted to permit adjustment thereof.

A manual operating rod 170 is pivoted in a bracket 171 carried by partition 176 and is connected at 173 to the arm 165 carrying the cam engaging lug 129. Operating lever 171 extends outwardly through a slot 174 at top 22 of casing 21 and terminates a handle portion 175 closely adjacent knot tying head 111 and loop lifting arm 158. When the rod is depressed, lug 129 engages cam 127 to force clutch 126 into engagement with clutch 130.

As best shown in FIGURE 12, shaft 109 carries an additional cam 180, which acts against a notch 181 and one end of an arm 182 which is centrally pivoted as at 183 to partition or support wall 106. The other end of the arm 182 carries an elongated eye 184 which surrounds a pin 185 which is connected to lug 160. Thus, upon completion of the operation performed by rotation of shaft 109, pin 185 moves lug 160 to move clutch 146 into engagement with clutch 147 and rotate lifting arm cam 140.

As best shown in FIGURE 11, a tube 180 extends below base 157, preferably through a slot 187 in table or support 24, and contains a heavy spring 188, adjustable by means of a screw 189. The spring 188 engages a plunger rod 190 which is connected to a yoke 191 to which cam follower 93 is secured by means of screws 110. This spring through rod 190 and yoke 191 acts upon the rotation of cam 102 to a point past the high dwell of cam follower plate 93 and causes the scissor blade 86 to snap against its associated stationary blades and sever the thread.

From the foregoing, operation of the device should now be readily understandable.

Figure 7:
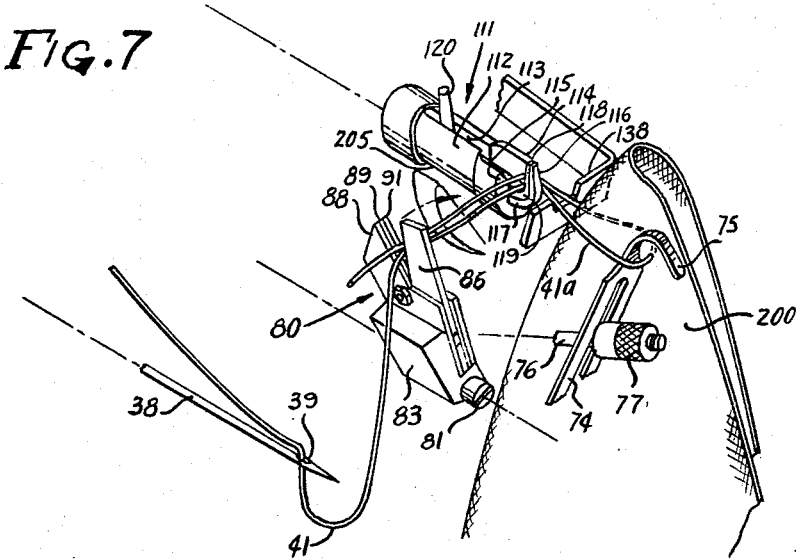
FIGURE 7 is a fragmentary perspective view showing the initial position of the doubled belt loop on the knot tying head comprising an element of the instant invention, and prior to the actuation thereof.
Figure 2:
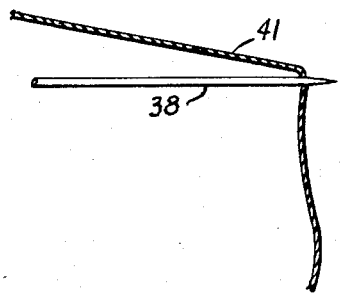
Figure 3:
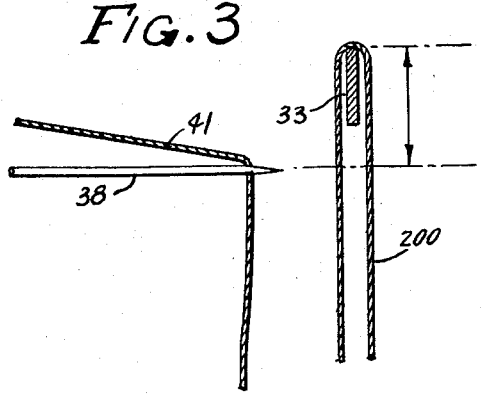
Figure 4:
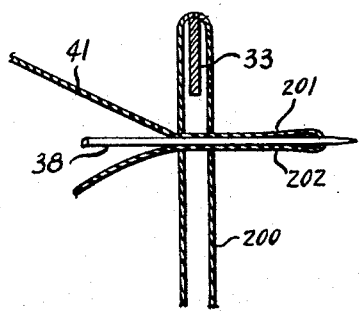
Figure 5:
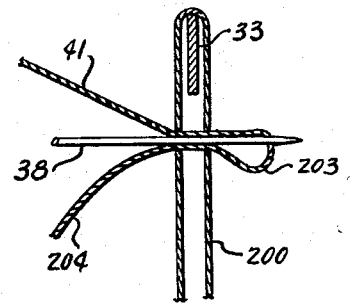
Figure 6:
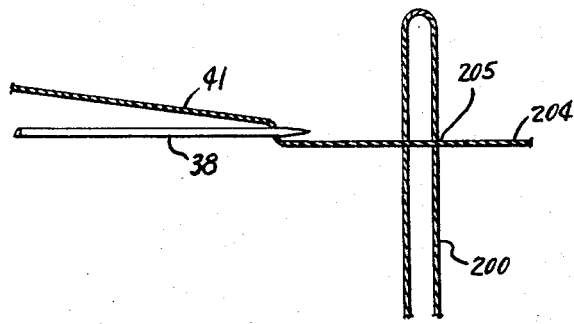
Figure 8:
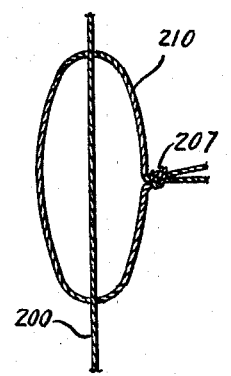
FIGURE 8 is a sectional view of the completed belt loops showing the tied knot effected by the machine of the instant invention.

Needle 39 is threaded, and a garment 200 is draped over support 33. A double thickness of the garment is then pressed against the yieldable guard 37 and against the needle 39 from the position shown in FIGURE 3 to the position shown in FIGURE 4. A double thickness of thread 201 and 202 is thus inserted through the doubled fabric of the garment 200 and when the fabric is partially withdrawn from the needle a loop 203 is formed therein as shown in FIGURE 5. The loop is grasped, and one end 204 held in the fingers so that when the needle is retracted to the position of FIGURE 6, a single strand of thread as shown at 205, extends through a double thickness of the garmnt. The garment 200 is then positioned as shown in FIGURE 7, and the end 205 together with that portion 41a of thread 41 still attached to the spool is looped over head 111 behind the fingers 116 and 118, and the two strands inserted tightly between the fixed blades 88, 89 and 91 and the movable blade 86, there being sufficient pressure against the blades at the base of the notch formed thereby securely to hold the thread in position. The motor 139 is constantly energized, and at this point, the operator strikes the operating handle 175 which, by movement of lug 129, engages the clutch plates 126 and 130. This causes rotation of the shaft 109 which in turn rotates the knot typing head 111. As the head is rotated in a clockwise direction, as shown in FIGURE 14, cam follower pin 120 rides along cam 122, and gradually separates finger 118 from finger 116. At the same time the cam surface 115 is conjunction with the upstanding fingers 116 and 118 form a loop in the ends 205 and 41a of the thread. As the rotation is nearly completed, the fingers now separated coming up under the loop thread, tightly clamp the two threads. Since the fingers come up on opposite sides of the double thread and hold the same until rotation has continued to the point where cam 102, through yoke 191 and spring 188 causes the scissor blade to snap severing the thread. Simultaneously, the cam 180 is rotated tilting the lever 182 until as the cam completes its rotation, the pin 185 acts to shift the lug 160 which in turn engages clutch faces 146 and 149. Since the shaft 142 is constantly driven, the engagement of the clutch faces causes consequent rotation of cam 150. This operation raises the lift arm 138 which is as shown directly beneath the thread loop, and by raising the thread pulls the knot tight while the ends thereof are still tightly held by the fingers 116 and 118. Continued raising of the lift arm releases the ends from the engagement of the fingers, with a completed knot 207 formed, as shown in FIGURE 8, and the belt loop completed as shown at 210. After the garment, shown as doubled at 200, is straightened out, the knot 207 is on the inside of the dress therein.

After completion of the lifting operation, the lift arm is returned partially by gravity and partially be means of a spring 211 on the end of shaft 154 to its downmost position, at which time the device is ready for recycling.

From the foregoing it will now be seen that there is herein provided an improved device for forming and tying belt loops which accomplishes all the objects of this invention, and others, including many advantages of great practical utility and commercial importance.

As many embodiments may be made of this inventive concept, and as many modifications may be made in the embodiment herein shown and described, it is to be understood that all matter herein is to be interpreted merely as illustrative and not in a limiting sense.

I claim:

1. In a device for forming and tying belt loops, in combination, a base, a support for a garment thereon, a housing adjacent said support, a needle extending outward from said housing, belt loop thread material threaded through said needle, the garment being adapted to be doubled and pressed against said needle to extend said thread through a double thickness of the garment; a hook extending from said housing, a knot tying head including a pair of separable fingers adjacent said hook, said thread being doubled over said hook and extended over said knot tying head adjacent said fingers, a thread holder and scissors carried by said casing adjacent said knot holder, said thread holder including a pair of blades between which the ends of said doubled thread are positioned and held, means for rotating said knot tying head in a direction to form a loop in said doubled thread, means to separate said fingers simultaneously with the rotation of said head, means to release said fingers to clamp a portion of the doubled thread exteriorly of the loop after formation, means simultaneously to activate said scissor blades to sever and release the doubled thread when said thread is clamped by said fingers, a lifting arm extending from the casing between said hook and said head, means operable in conjunction with said means for rotating said head and said means actuating said scissors, for lifting said arm to lift said thread from said knot tying head while still clamped by said fingers to tighten the knot, and to remove the tied belt loop from the knot tying head.

2. The structure of claim 1 wherein the means for rotating said knot tying head includes a motor in said casing, a shaft carrying said head rotatable by said motor and clutch means in said shaft.

3. The structure of claim 2 wherein the means for separating said separable fingers include a cam mounted on said casing and a cam follower connected to one of said fingers, said fingers including extending shanks mounted on and rotatable by said shaft, whereby said follower moves one of said shanks to separate said fingers upon rotation of said shaft.

4. The structure of claim 3 wherein spring means carried by said shaft normally urge said separable fingers to clamping position, said spring means comprising the means for clamping said fingers after separation by said cam follower when the follower has passed the cam.

5. The structure of claim 4 wherein said knot tying head has a cam surface adjacent said fingers which upon rotation of said head guides said doubled thread into loop forming position.

6. The structure of claim 5 wherein said thread holder and scissors include a pivoted blade, a spring is mounted on said housing, means connect said spring to said pivoted blade, a cam carried by said shaft tensions said spring, and releases said spring to snap said blade simultaneously with the clamping of said fingers, said spring and cam comprising said means for actuating said scissors.

7. The structure of claim 6 wherein said lifting arm is pivotally mounted on said casing and is connected to a cam follower, said cam follower engaging a rotatable cam carried by a second shaft driven by said motor.

8. The structure of claim 7 wherein said second shaft includes a second clutch, and means for activating said second clutch simultaneously with the deactivation of said first-mentioned clutch.

9. The structure of claim 8 wherein a manual operating handle extends from said casing to a point adjacent said knot tying head, and a cam engaging lug carried by said handle activates said first clutch, and spring means on said first-mentioned shaft bias said first clutch into inoperative position.

10. The structure of claim 9 wherein a pivoted arm is mounted in said casing, and a second cam engaging lug operable to activate said second clutch is mounted adjacent one end of said pivoted arm, an additional cam carried by said first shaft pivots said arm to move said second cam engaging lug, said additional cam being correlated to permit complete rotation of said head prior to activation of the second mentioned clutch.

11. The structure of claim 10 wherein said thread is carried by a spool mounted on said housing and supported to said needle through a pivoted feed rocker.

12. The structure of claim 11 wherein a spring biased needle guard is carried by said housing adjacent said needle.

References Cited by the Examiner

UNITED STATES PATENTS

| 2,906,218 | 9/1959 | Minchenberg | 112—104 |
| 3,051,102 | 8/1962 | Minchenberg | 112—104 X |
| 3,095,842 | 7/1963 | Metzger | 112—104 |

JORDAN FRANKLIN, *Primary Examiner.*

G. V. LARKIN, *Assistant Examiner.*